INVENTORS
EUGENE M. GLUHAREFF
ROBERT G. McINTYRE
BY
Robert O. Richardson
— ATTORNEY —

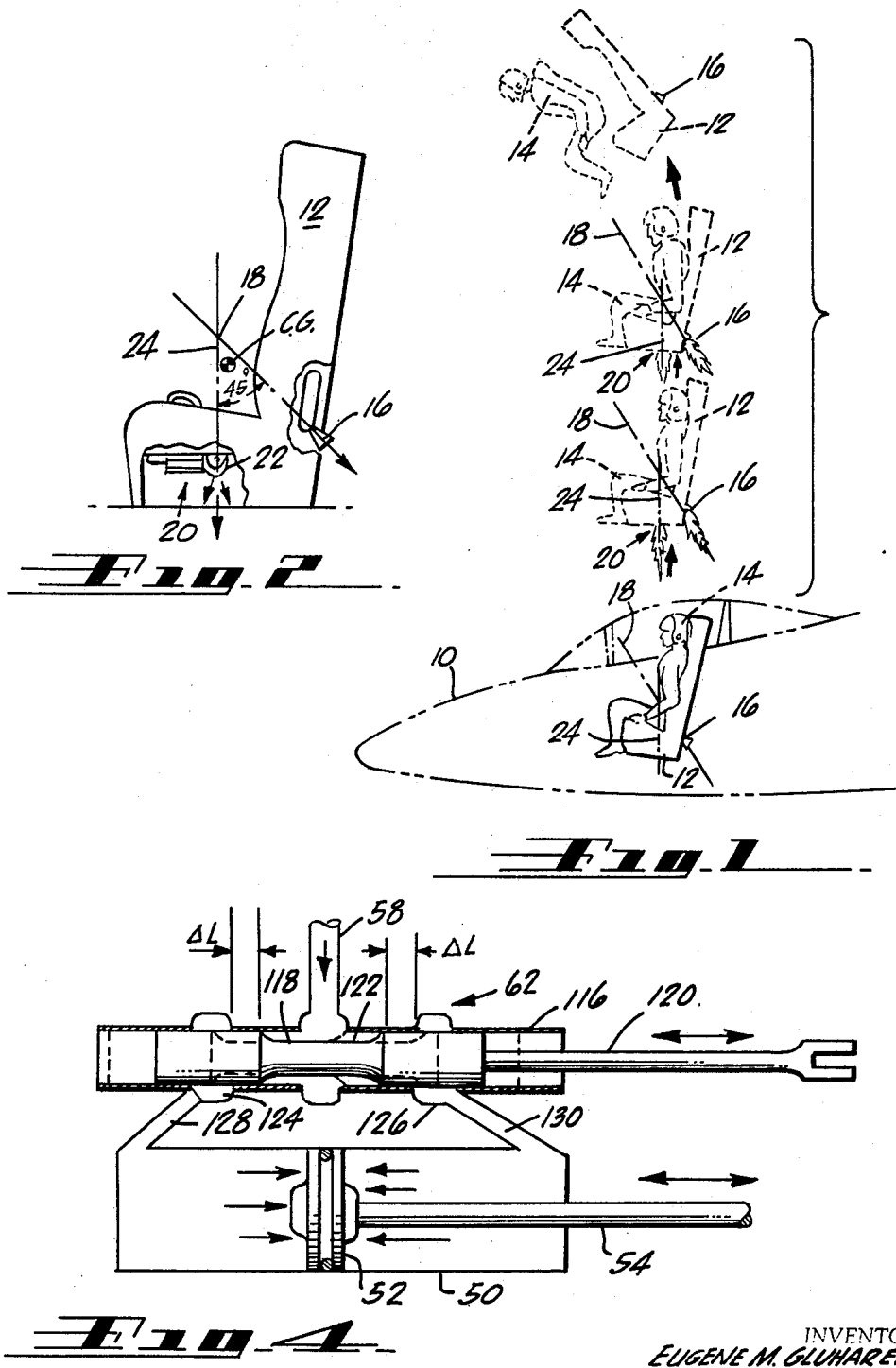

United States Patent Office 3,487,445
Patented Dec. 30, 1969

3,487,445
POWER ACTUATED GYRO CONTROLLED EJECTION SEAT STABILIZING SYSTEM
Eugene M. Gluhareff, Gardena, and Robert G. McIntyre, Manhattan Beach, Calif., assignors to McDonnell Douglas Corporation, a corporation of Maryland
Filed Mar. 11, 1968, Ser. No. 711,980
Int. Cl. B64d 25/10
U.S. Cl. 244—122                             8 Claims

ABSTRACT OF THE DISCLOSURE

A power actuated gyro controlled ejection seat stabilizing system wherein a gyro actuates a servo valve which in turn controls a pneumatic actuator for rotating rocket motor thrust in the guidance of an ejection seat from an aircraft.

BACKGROUND OF THE INVENTION

In the event of an emergency, an established safe ejection procedure for aircratf pilots is to eject the pilot and seat in an upward direction away from the aircraft and earth below. The seat and pilot are catapulted from the aircraft and then propelled upward by means of a propelling rocket located on the back of the seat at its lower edge. After burn-out of the propelling rocket, the seat and pilot soon reach the apogee of the ejection projectory. At this time, the pilot separates from the seat and thereafter assumes a normal parachute descent to the earth. The propelling rocket has a fixed line of thrust, the thrust line passing through the center of gravity of the pilot and seat. This center of gravity will vary with individual pilots. Also, due to some micrometric rocket nozzle physical misalignment, aerodynamic variation, and irregularities of gass flow, the effective thrust vector does not alwaysh go through the center of rotation and thus an undesirable torque results. This may be hazardous to the pilot as he may be redirected toward his own aircraft or it could cause entanglement of the deploying parachute. In Patent Number 3,362,662 for a Gyro Controlled Ejection Seat Stabilizing Rocket which issued Jan. 9, 1968, to McIntyre et al., a control rocket was attached directly to the ejection seat, the control rocket having a variable line of thrust. A gyroscope was directly connected through a suitable mechanical linkage arrangement to the control rocket. As the inherent function of the spinning gyro, when acted upon by an outside force, is to align its rotational axis in the plane of rotational force, the gyro is arranged to control the line of thrust of the control rocket and thereby counteract the ejection seat rotational torque. Suitable apparatus is provided to ignite the rocket and actuate the gyro upon ejectment of the ejection seat.

The magnitude of the undesirable rocket torque sometimes overpowers the gyro procession force, destroying the usefulness of the gyro, and allowing the seat to move in an uncontrolled rotation at low pitch rates. To eliminate such possibilities and to improve reliability, the new system comprising the present invention eliminates the direct gyro action for positioning of the rocket nozzle and reverts to an indirect action.

SUMMARY OF THE PRESENT INVENTION

A power actuated platform stabilizing system of the present invention utilizes the gyro to actuate a miniature servo valve to control a powerful pneumatic actuator, which in turn rotates the rocket motor and nozzle on command from the gyro to change the direction of rocket thrust. The energy to the actuator is provided by bleeding high pressure gas, on the order of 5000 p.s.i.a., from the rocket combustion chamber. In view of the fact that the combustion chamber gas is hot and contaminated, a filter is provided ahead of the servo valve to prevent fouling and jamming. This filter consists of a sizable disk of sintered bronze which is an excellent heat sink due to microscopic passages, high coefficient of heat transfer, and relatively large mass. Actuation energy may also come from other sources when available and desired. The servo valve is so designed that the actuator piston is pneumatically locked in any position and cannot be moved by external force. The valve design is such that the gas flow to the system is reduced to a minimum. This results in no pressure drop in a rocket combustion chamber and the heat flow to the heat sink is kept to a minimum. The gas line leading the hot gas to the actuator connected to the filter to provide a solid connection and yet eliminate the restraining torque on the rocket motor. To some extent, this also cools the hot gas as it pulses through the steel line.

BRIEF DESCRIPTION OF THE DRAWINGS

FIGURE 1 is a sequential view picturing an aircraft seat and its occupant in various catapulted stages;

FIG. 2 is a side elevational view, partly in section, of an aircraft seat embodying the apparatus of this invention;

FIG. 4 is a schematic diagram illustrating the indirect control of the rocket motor nozzle direction controlled by the gyro through a servo valve.

DESCRIPTION OF ILLUSTRATIVE EMBODIMENTS

Figure 3:
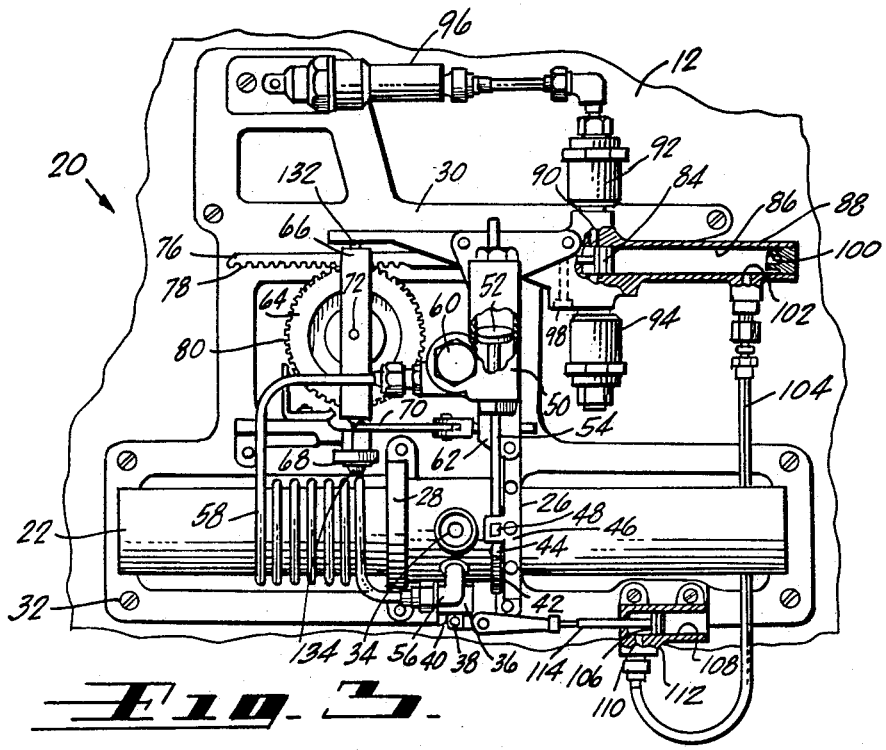
FIG. 3 is a part sectional plan view of the appartus of this invention as it would be installed in an aircraft ejection seat.

For the purpose of establishing various relative positions that occur during a seat ejectment, an aircraft 10 has been pictured schematically in FIG. 1. The specific construction of the aircraft 10 is unimportant to an understanding of the invention, and therefore need not be depicted in detail.

Within the aircraft 10 is mounted a seat 12, a pilot 14 seated therein. The seat 12 and pilot 14, upon ejectment from the aircrtf 10, are propelled upwardly by the thrust from the primary rocket 16. The line-of-thrust 18 of the primary rocket 16 is designed to pass through the combined center of gravity of the pilot and seat. If the line-of-thrust is so aligned, the seat and pilot would be propelled upwardly in perfect vertical alignment and with no rotational movements. However, as the line-of-thrust of the primary rocket is fixed and the combined center of gravity is variable because of the different size and weight of the pilots, such perfect line-of-thrust alignment is practically impossible. Since any misalignment cuases sufficient rotational torque which affects seat trajectory, some means must be employed to maintain the desired trajectory of the aircraft seat.

To counteract such rotational torque a secondary thrust rocket apparatus 20 is provided, as shown in FIG. 2. Apparatus 20 is located on the under portion of the seat 12 and securely fastened thereto. The secondary rocket 22 is positioned so its line-of-thrust 24 also passes approximately through the combined center of gravity of the seat and pilot. The secondary rocket 22 is shown in FIG. 3 as being cylindrically shaped and rotatably mounted by bearings 26 and 28 on frame 30. Frame 30 is securely fastened by bolts 32 to the aircraft seat 12. Rocket 22 is of conventional construction, the specific details of such forming no part of this invention. It is to be noted that rocket 22 is mounted within bearings 26 and 28, allowing rotational movement within one plane to control the pitch of the aircraft seat. Pitch is the most hazardous of the rotational movements with roll and yaw being secondary. Second and third gyro control rocket units could be employed to control both roll and yaw. However, the principal movement is due to pitch, usually not requiring a means to control roll and yaw. Rocket 22 has a nozzle 34, detonation chamber 36, firing pin 38.

A firing sear 40 is so associated with firing pin 38 that its withdrawal causes the firing pin to actuate the primer in chamber 36. This ignites the fuel within the vernier rocket 22, and thus causes the emission of exhaust gases from rocket nozzle 34. This ignition of the rocket 22 will be more fully explained hereinafter. The rocket 22 is caused to rotate in bearings 26, 28 by means of an arrangement powered by a power drive piston within an actuator cylinder. Gear 42 is mounted around the vernier rocket 22 and gear rack 44 is engageable therewith for actuation thereof. A guide plate 46 has a nylon guide 48 engageable with the gear rack 44 to maintain it in rack and gear relationship with the gear 42. This transforms the longitudinal movement into the rotational movement of the rocket. The actuator cylinder 50 contains a drive piston 52 which, when actuated, will move the piston rod 54 and gear rack 44 on the end thereof longitudinally. The movement of the piston preferably is done with exhaust gases from the rocket, a high pressure gas outlet port 56 is affixed to the rocket nozzle 34 in such manner that a small portion of the high pressure gasses is bled off. A high pressure gas line 58 extends from the gas outlet port 56, is coiled around the rocket fuel container, and is connected to a filter 60. The coil permits a solid connection while eliminating any restraining torque to the rocket motor and also, to some extent, cools the hot gases as they pass therethrough. The filter 60 if of sintered bronze which filters the hot and contaminated gases to prevent fouling or jamming. From the filter the gases pass to a servo valve 62 which is used to actuate the piston 52 in the actuator cylinder 50.

The servo valve 62 is controlled by a gyro 64 mounted on a gimbal 66 which is pivotally mounted to frame 30. A clevis 68 and link 70 interconnects the gimbal with the servo valve core. Gimbal 66 incorporates a rotatable gyro wheel 64 mounted through a shaft 72, perpendicular to the pivot axis of the gimbal 66. The gyroscope wheel 64 is rotatable by gas-operated piston rod 76. Rod 76 has teeth thereon which engage teeth 80 on the periphery of the gyroscope wheel 64. Gimbal 66 has an aperture 82 therein (shown in FIG. 5) which slidably retains rod 76 to allow only longitudinal movement of the rod 76 and to maintain engagement of the rod with the wheel 64 during actuation. The meshed teeth relationship between the wheel 64 and the rod 76 ceases when rod 76 is pulled to the extreme right and gyro wheel 64 continues spinning.

Attached to the other end of the rod 76 is a piston head 84. Piston head 84 is slidable within a cylinder 86 located in housing 88. An annular inlet chamber 90 is provided at the front end of the housing 88. With the piston head 84 positioned nearest the front end of the housing 88, the rod 76 is located to give maximum contacting distance with the wheel 64. Exteriorally of annular chamber 90 there is provided two accumulators, 92 and 94, which serve as storage chambers. A gas supply means 96 is provided and connected to annular chamber 90 through these accumulators. The function of the accumulators is to provide a large quantity of gas at a predetermined pressure to act against the piston head 84, thereby causing constant acceleration of the piston head 84 in its travel to the right in FIG. 3. It has been found that to rotate the wheels 64 at the necessary RPM, the piston rod 76 must travel at a certain rate. This rate is accomplished with a 250 pound initial force applied to the piston head 84. A shear pin 98 is provided through rod 76 to hold the piston head 84 until the required force is applied to the piston head. For example, to rotate the gyro to 7,000 r.p.m., a 250 pound initial gas pressure force must be applied to the piston head with three inches of piston travel. A shock absorbing means 100 is provided at the back end of housing 88 to serve as a stop after the head has cleared port 102. Once rod 76 is fully extended, a suitable detent, not shown, prevents backward movement of rod 76 which would interfere with the rotating wheel 64.

Connected to outlet 102 is a gas line 104 which conducts the gas discharge from cylinder 86 to a second gas-operated piston 106 and housing 108 through port 110. Piston 106 is slidable within cylinder 108 located within housing 112. Piston 106 is connected to a piston rod 114 which in turn is connected to the firing pin 38. The rod 114 operates within a slot in the firing pin 38. The rod 114 operates within a slot in the firing pin and has an end portion beveled to form a protruding cam or firing sear 40. Upon gas pressure through port 110 operating piston 106, the firing sear 40 causes the firing pin 38 to retract and compress a spring. When the firing sear 40 becomes disconnected with the firing pin 38, the firing pin 38 is forced forward by this spring thereby igniting the control rocket 22. It will be noted that since the firing pin 38 is operated with the discharge of gas from the gyro operating piston 84, a rocket 22 will not be fired until the gyro is rotating at the desired speed.

Figure 5:
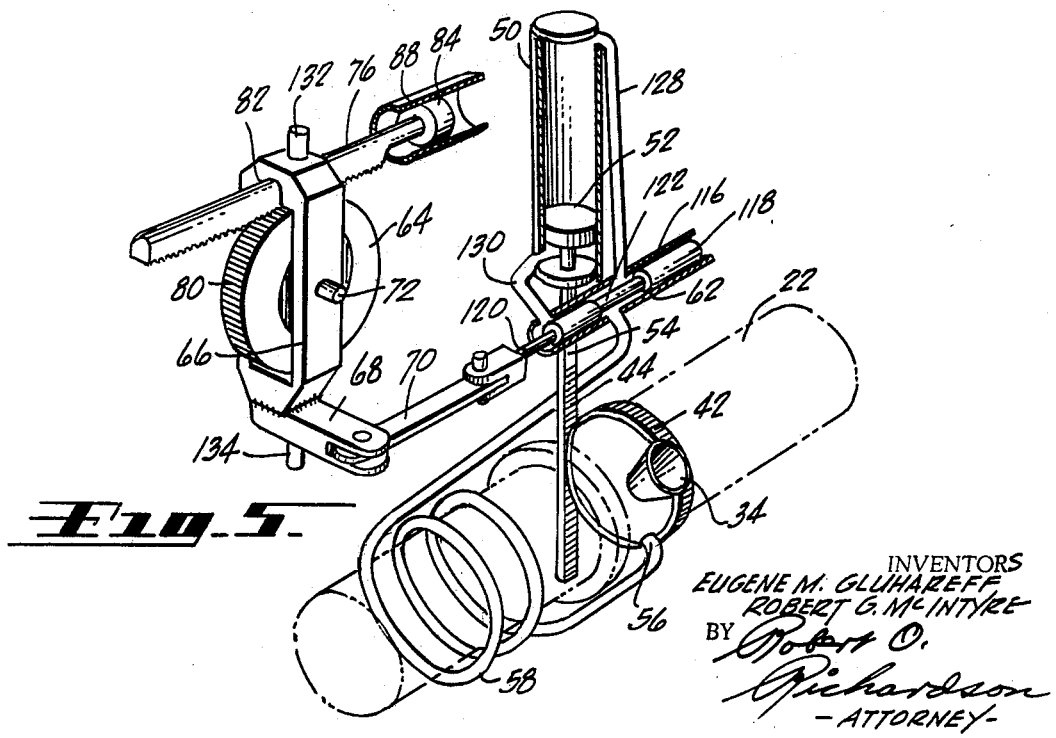
FIG. 5 is a schematic view showing the relationship between the gyro and the rocket nozzle actuated thereby.

Reference is now made to FIGS. 4 and 5 which illustrate one form of powered actuation of the rocket 22 in response to a rotation of the seat relative to the plane established by rotation of the gyroscope wheel 64. In the schematic shown in FIG. 4, gas line 58 comes from the high pressure port in rocket 22 to the servo valve 62. This servo valve consists of a cylinder housing 116 in which a servo valve core 118 translates in response to a force applied to servo valve rod 120 through the linkage connected to the gyroscope. Core 118 has an annular recessed portion 122 which forms a continuation of fluid passage 58. Spaced outlet ports 124 and 126 are connected to passageways 128 and 130, respectively. The passageways communicate with actuator cylinder 50 on opposite sides of the power drive piston 52. When rod 120 pushes the core 118 to the left in FIG. 4, an open path is made between port 58 and passage 128 to thus move piston 52 and actuating rod 54 outwardly. With core 118 to the left, path 130 is vented to atmosphere to eliminate any back pressure. When actuating rod 120 is moved to the right, the recessed portion 122 provides a fluid pressure communication between port 58 and conducting path 130 to move piston 52 to the left and power drive rod 54 inwardly. In this case path 128 is vented to atmosphere. The lateral motion of rod 54 causes rotation of vernier rocket 22 and the direction of thrust from the rocket nozzle 34.

The operation of this servo valve 62 may be more clearly understood with reference to the illustration in FIG. 5. Here there is shown the vernier rocket 22 in dashed lines with gear ring 42 therearound. Gear rack 44, which is an extension of piston rod 54, is engageable with the gear 42 for rotation of the rocket and to direct the thrust from rocket nozzle 34. Cylinder 50 contains piston 52 on the end of piston rod 54 and has two fluid passageways 128 and 130 for the passage of fluid to move the piston head 52 and thus rotate the rocket 22. Servo valve 62 interconnects passages 130 and 128 with a high pressure line 58 leading from the rocket combustion chamber. Gyro wheel 64 is rotatably mounted on axis 72 to gimbal 66 which, in turn, is pivotally mounted by pivot pins 132 and 134 to the ejection seat base, not shown. When actuating piston 84 in cylinder 88 is moved to the right, the actuating rack 76 starts the spinning movement of the gyro wheel 64. When the seat tilts from its initial thrust direction, the gyro causes clevis 68 to move link 70 and thus the servo valve core 118 to move from its centered position in servo valve housing 116. This, in turn, determines whether passageway 128 or 130 is to be connected with the high pressure gas line 58, the opposite line then being ported to ambient pressure.

In operation, when it becomes necessary for the pilot 14 of the aircraft 10 to employ the ejection seat apparatus, the seat 10 and pilot 12 are catapulted from the aircraft with a primary rocket 16 initiating the thrust to propel the seat and pilot forward. Upon the catapulting action gas under pressure is supplied to the accumulators 92 and 94 from a separate supply means 96, as shown in the drawing, or from some other supply means used in the catapulting procedure such as, for example, a gas bleed from the main rocket or a cold gas supply from a high pressure gas bottle. Upon the gas reaching the predetermined pressure, shear pin 98 is broken, thereby causing longitudinal movement of piston 84 and connecting rod 76. Through the toothed connection between rod 76 and wheel 64, wheel 64 is rotated on gimbal 66 and serves as a gyroscope. Gimbal 66 is mounted on the horizontal lower surface of the aircraft seal 12 with the longitudinal axis of the gimbal 66 being in a pitch plane with respect to seat 12.

Once piston 84 has been fully extended the remaining gas under pressure is conducted to the second piston 106, shown in FIG. 3, which causes movement of rod 114. Such action causes the operation of firing pin 38 which ignites control rocket 22. The line-of-thrust of rocket 22 is variable in a vertical plane through the combined center of gravity of the seat 12 and pilot 14. If the seat starts to rotate either clockwise or counterclockwise from its initial ejected position, the gyroscope rotates rocket 22 through the servo valve 52 and power drive piston rod 54 to provide a thrust which will counteract the seat rotational or pitch movement. In this manner the seat and pilot are maintained in their correct alignment for continuing the safe ejection procedure.

It will be obvious to those skilled in the art that various changes may be made in the invention without departing from the spirit and scope thereof and therefore the invention is not limited to that which is illustrated in the drawings and described in the specification.

We claim:

1. A power actuated ejection seat stabilizing system comprising:
    a primary propulsion means for propelling said seat along a predetermined path,
    stabilizing means for maintaining said seat in a consistent attitude while being thus propelled, said stabilizing means including a rotatable rocket attached to said seat and having a nozzle providing a thrust in a direction determined by the rotatable position of said rocket,
    means rotating said rocket nozzle to provide a thrust in a direction to counteract change of said seat from said consistent attitude, said rotating means comprising:
        a sensing means for sensing change of said seat from said consistent attitude,
        fluid power means for rotating said rocket nozzle, and
        means interconnecting said power means with said sensing means to cause said power means to be actuated in response thereto.

2. A power actuated ejection seat stabilizing system as set forth in claim 1,
    said power means comprising a fluid pressure actuated piston having a rocket rotating mechanism attached thereto whereby movement of said piston causes rotation of said rocket,
    said interconnecting means comprising a fluid pressure path and servo valve means responsive to said sensing means for diverting fluid pressure to said piston for actuation thereof.

3. A power actuated ejection seat stabilizing system as set forth in claim 2, and means for activating said gyro upon ejection of said seat.

4. A power actuated ejection seat stabilizing system as set forth in claim 3 wherein said activating means includes a power driven rack and gear mechanism for spinning the wheel of said gyro.

5. A power actuated ejection seat stabilizing system as set forth in claim 3, and means for firing said rocket after activation of said gyro.

6. A power actuated ejection seat stabilizing system as set forth in claim 1 wherein said sensing means is a gyro having linkage connected thereto and with said interconnecting means.

7. A power actuated ejection seat stabilizing system as set forth in claim 1, said power means comprising:
    a rack and gear mechanism for translating longitudinal movement of said rack into rotational movement of said rocket,
    a fluid pressure actuated cylinder having a piston connected to said rack for longitudinal movement thereof,
    a fluid pressure source including a connection with said rotatable rocket to receive hot gases therefrom, said connection being made to ports in said cylinder for actuation of said piston,
    said interconnecting means between said sensing means and said power means including a servo valve actuable by said sensing means.

8. A power actuated ejection seat stabilizing system as set forth in claim 7, and a metallic sintered filter between said connection and said cylinder for cooling and filtering said hot gases from said rocket.

References Cited

UNITED STATES PATENTS 3,362,662   1/1968   McIntyre _____ 244—122

MILTON BUCHLER, Primary Examiner

T. W. BUCKMAN, Assistant Examiner

U.S. Cl. X.R.

244—79

PO-1050
(5/69)

UNITED STATES PATENT OFFICE
CERTIFICATE OF CORRECTION

Patent No. 3,487,445      Dated   30 December 1969

Inventor(s)    Eugene M. Gluhareff and Robert G. McIntyre

It is certified that error appears in the above-identified patent and that said Letters Patent are hereby corrected as shown below:

In Column 2, line 17, after "actuator" add --is a coil wound around the rocket fuel container and--;
In Column 4, line 20, delete in its entirety.

SIGNED AND
SEALED
AUG 25 1970

(SEAL)
Attest:

Edward M. Fletcher, Jr.
Attesting Officer

WILLIAM E. SCHUYLER, JR.
Commissioner of Patents